United States Patent
Hua et al.

(10) Patent No.: US 12,457,054 B2
(45) Date of Patent: Oct. 28, 2025

(54) DATA MODULATION METHOD AND DEVICE, DATA DEMODULATION METHOD AND DEVICE, SERVICE NODE, TERMINAL, AND MEDIUM

(71) Applicant: ZTE CORPORATION, Shenzhen (CN)

(72) Inventors: Jian Hua, Shenzhen (CN); Yu Xin, Shenzhen (CN); Tong Bao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 409 days.

(21) Appl. No.: 17/924,272

(22) PCT Filed: Feb. 20, 2021

(86) PCT No.: PCT/CN2021/077060
§ 371 (c)(1),
(2) Date: Nov. 9, 2022

(87) PCT Pub. No.: WO2021/227591
PCT Pub. Date: Nov. 18, 2021

(65) Prior Publication Data
US 2023/0188246 A1 Jun. 15, 2023

(30) Foreign Application Priority Data
May 12, 2020 (CN) .......................... 202010398730.7

(51) Int. Cl.
*H04B 1/00* (2006.01)
*H04L 1/00* (2006.01)
(Continued)

(52) U.S. Cl.
CPC .......... *H04L 1/0003* (2013.01); *H04L 27/186* (2013.01); *H04L 27/20* (2013.01); *H04L 27/3411* (2013.01); *H04L 27/3416* (2013.01)

(58) Field of Classification Search
CPC ..... H04L 1/0003; H04L 27/186; H04L 27/20; H04L 27/3411; H04L 27/3416; H04L 27/2614; H04L 27/2634
(Continued)

(56) References Cited

U.S. PATENT DOCUMENTS

2018/0337816 A1* 11/2018 Herath .................. H04L 27/362

FOREIGN PATENT DOCUMENTS

| CN | 104301071 A | 1/2015 |
| CN | 105409150 A | 3/2016 |

(Continued)

OTHER PUBLICATIONS

International Search Report in Application No. PCT/CN2021/077060, dated May 8, 2021, 4 pages including English translation.
(Continued)

*Primary Examiner* — Tanmay K Shah
(74) *Attorney, Agent, or Firm* — Morgan, Lewis & Bockius LLP

(57) ABSTRACT

Provided are a data modulation method and device, a data demodulation method and device, a service node, a terminal, and a medium. The data modulation method is applied to the service node, and the data modulation method includes that: a modulation parameter A is determined according to a modulation manner of data; and the data is modulated according to a target constellation point symbol, where the target constellation point symbol is a product of A and X, and X is an initial constellation point symbol corresponding to the modulation manner.

18 Claims, 5 Drawing Sheets

---

Determine a modulation parameter A according to a modulation manner of data — 110

Modulate the data according to a target constellation point symbol, where the target constellation point symbol is a product of A and X, and X is an initial constellation point symbol corresponding to the modulation manner — 120

(51) Int. Cl.
*H04L 27/18* (2006.01)
*H04L 27/20* (2006.01)
*H04L 27/34* (2006.01)

(58) Field of Classification Search
USPC .......................................................... 375/295
See application file for complete search history.

(56) References Cited

FOREIGN PATENT DOCUMENTS

| CN | 109561037 A | * | 4/2019 | ............... H04L 1/00 |
| CN | 111901281 A | | 11/2020 | |

OTHER PUBLICATIONS

Extended European Search Report in Application No. 21804221.6, dated May 7, 2024, 8 pages.

Yang, X., Zhu, X., Zeng, Z., & Guo, G. (2010, September). Analysis of Power De-Rating Represented by Maximum Power Reduction and Cubic Metric in LTE Uplink Transmission. In 2010 6th International Conference on Wireless Communications Networking and Mobile Computing (WiCOM) (pp. 1-4). IEEE.

Zhao, C., Baxley, R. J., Zhou, G. T., Boppana, D., & Kenney, J. S. (Jan. 2007). Constrained clipping for crest factor reduction in multiple-user OFDM. In 2007 IEEE Radio and Wireless Symposium (pp. 341-344). IEEE.

Xiong, B., Zhu, X., Li, W., & Guo, G. (2012, December). Analysis of maximum power reduction of uplink for carrier aggregation in LTE-A system. In 2012 International Conference on Connected Vehicles and Expo (ICCVE) (pp. 49-54). IEEE.

Skyworks Solution, Inc., "Intra-band Contiguous EN-DC and Applicability of SA MPR and A-MPR", 3GPP TSG-RAN WG4 Meeting #88bis, R4-1813122, Chengdu, China, Oct. 8-12, 2018, 5 pages.

* cited by examiner

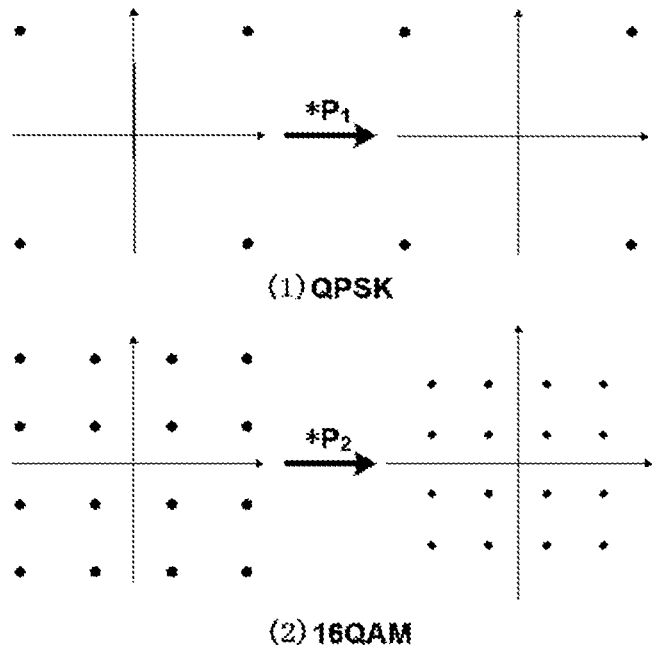

FIG. 8

```
┌─────────────────────────────────────────────────────────────┐
│ Receive data modulated according to a target constellation  │
│ point symbol, where the target constellation point symbol   │
│ is a product of A and X, X is an initial constellation      │─ 210
│ point symbol corresponding to a modulation manner, and A    │
│ is a modulation parameter determined according to the       │
│ modulation manner of the data                               │
└─────────────────────────────────────────────────────────────┘
                              │
                              ▼
┌─────────────────────────────────────────────────────────────┐
│ Demodulate the data according to the target constellation   │─ 220
│ point symbol and the modulation parameter A                 │
└─────────────────────────────────────────────────────────────┘
```

FIG. 9

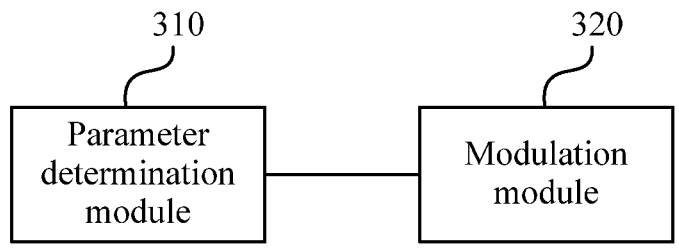

FIG. 10

DATA MODULATION METHOD AND DEVICE, DATA DEMODULATION METHOD AND DEVICE, SERVICE NODE, TERMINAL, AND MEDIUM

CROSS REFERENCE TO RELATED APPLICATIONS

This is a National Stage Application filed under 35 U.S.C. 371, based on International Patent Application No. PCT/CN2021/077060, filed on Feb. 20, 2021, which is based on claims priority to Chinese Patent Application No. 202010398730.7 filed with the China National Intellectual Property Administration (CNIPA) on May 12, 2020, the disclosures of which are incorporated herein by reference in their entireties.

TECHNICAL FIELD

The present application relates to the field of wireless communication networks, for example, a data modulation method and device, a data demodulation method and device, a service node, a terminal, and a medium.

BACKGROUND

A downlink transmission may be performed by using a single-carrier manner in a high-frequency scene such as a fifth generation (5G) mobile communication system, and in this case, some terminals are far away from a service node and some terminals are close to the service node, and modulation manners adopted by the terminals are different. For a modulation manner with a relatively high transmission power, a peak to average power ratio is usually relatively high, the power influence of data after passing through a power amplifier is relatively large, and in order to satisfy a working characteristics of the power amplifier in a linear working region and improve the linearity of the power amplifier, an input power of the power amplifier needs to be backed off by a certain decibel in a data modulation process, the power amplifier is kept away from a saturation region to achieve the power back-off, but this modulation manner is very inefficient and limited in improvement and cannot be ensured to satisfy the working characteristics of the power amplifier.

SUMMARY

The present application provides a data modulation method and device, a data demodulation method and device, a service node, a terminal, and a medium, so as to achieve a flexible modulation of data and improve the modulation efficiency and reliability.

An embodiment of the present application provides a data modulation method. The data modulation method is applied to a service node and includes that: a modulation parameter A is determined according to a modulation manner of data; and the data is modulated according to a target constellation point symbol, where the target constellation point symbol is a product of A and X, and X is an initial constellation point symbol corresponding to the modulation manner.

An embodiment of the present application further provides a data demodulation method. The data demodulation method is applied to a terminal and includes that: data modulated according to a target constellation point symbol is received, where the target constellation point symbol is a product of A and X, X is an initial constellation point symbol corresponding to a modulation manner of the data, and A is a modulation parameter determined according to the modulation manner of the data; and the data is demodulated according to the target constellation point symbol and the modulation parameter A.

An embodiment of the present application further provides a data modulation device. The data modulation device includes a parameter determination module and a modulation module. The parameter determination module is configured to determine a modulation parameter A according to a modulation manner of data. The modulation module is configured to modulate the data according to a target constellation point symbol, where the target constellation point symbol is a product of A and X, and X is an initial constellation point symbol corresponding to the modulation manner.

An embodiment of the present application further provides a data demodulation device. The data demodulation device includes a receiving module and a receiving module. The receiving module is configured to receive data modulated according to a target constellation point symbol, where the target constellation point symbol is a product of A and X, X is an initial constellation point symbol corresponding to a modulation manner of the data, and A is a modulation parameter determined according to the modulation manner of the data. The demodulation module is configured to demodulate the data according to the target constellation point symbol and the modulation parameter A.

An embodiment of the present application further provides a service node. The service node includes one or more processors and a storage device. The storage device is configured to store one or more programs. The one or more programs, when executed by the one or more processors, cause the one or more processors to implement the data modulation method described above.

An embodiment of the present application further provides a terminal. The terminal includes one or more processors and a storage device. The storage device is configured to store one or more programs. The one or more programs, when executed by the one or more processors, cause the one or more processors to implement the data demodulation method described above.

An embodiment of the present application further provides a computer-readable storage medium. The computer-readable storage medium stores a computer program, where the computer program, when executed by a processor, implements the data modulation method or the data demodulation method described above.

BRIEF DESCRIPTION OF DRAWINGS

FIG. 8 is a schematic diagram of a data modulation for a terminal group provided in another embodiment;

FIG. 9 is a flowchart of a data demodulation method provided in an embodiment;

FIG. 10 is a schematic structural diagram of a data modulation device provided in an embodiment;

DETAILED DESCRIPTION

The present application will be described in conjunction with the drawings and embodiments below.

For a downlink transmission of a single-carrier system, when distances between different terminals and a service node are different, modulation manners of data are different, a peak to average power ratio of a high-order modulation manner is usually relatively high and is greatly influenced by a power amplifier, and how to improve the performance of a multi-terminal downlink transmission is a key problem. In a data modulation process, an input power of the power amplifier is backed off, the back-off operation is slow to implement, and thus the data modulation efficiency is affected.

The data modulation method provided in the embodiments of the present application may be applied to a service node, a modulation parameter is determined according to a modulation manner of the data, the flexible modulation of the data is achieved by using a target constellation point symbol, and the power control or back-off can also be achieved, whereby the modulation efficiency and reliability are improved.

Figure 1:
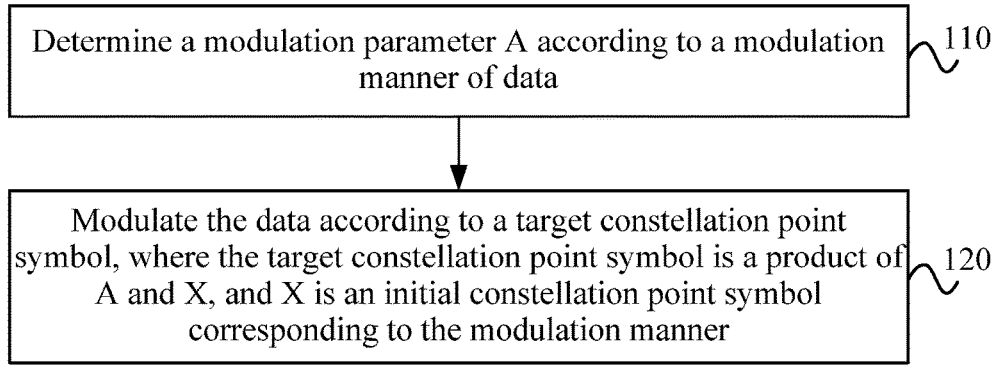
FIG. 1 is a flowchart of a data modulation method provided in an embodiment.

FIG. 1 is a flowchart of a data modulation method provided in an embodiment, as shown in FIG. 1, and the method provided in this embodiment includes steps 110 and 120.

In step 110, a modulation parameter A is determined according to a modulation manner of data.

In step 120, the data is modulated according to a target constellation point symbol, where the target constellation point symbol is a product of A and X, and X is an initial constellation point symbol corresponding to the modulation manner.

The data in this embodiment refers to data sent by a sending terminal (such as a base station) to a receiving terminal (such as a terminal), the modulation manner of the data may be an amplitude modulation, a frequency modulation, a phase modulation and the like, and the communication quality of a long-distance transmission is improved by loading the data signal frequency spectrum into a high-frequency channel for transmission. The modulation parameter A may be a complex number or a real number, and if A is the real number, the modulation parameter A may be used for performing a power control on a data transmission, so that a quick power backoff is achieved; if A is the complex number, a modulus value of the modulation parameter A may be used for the power control of the data transmission, and a complex portion of the modulation parameter A may also be used for changing the modulation manner of the data, for example, for BPSK modulated data, if $A=e^{j\pi x/2}$, then a BPSK modulation may be changed to π/2 BPSK modulation with a power factor of 1. A (or modulus values of A) corresponding to different modulation manners may be the same or different.

In a single-carrier downlink transmission, a target constellation point symbol adopted by a data modulation on a time domain may be represented as A*X, and X represents the initial constellation point symbol corresponding to the modulation manner. For data of each constellation point symbol, the data is multiplied by the modulation parameter A on the basis of the data modulated by the modulation manner described above, in this case, a power back-off does not need to be performed on data of different symbols at the receiving terminal, signals of a transmitting terminal may be flexibly and quickly ensured to be in a linear region of a power amplifier, and thus the modulation efficiency and reliability are improved.

In an embodiment, the modulation parameter A has a modulus value P, and modulation parameters A respectively corresponding to different modulation manners have different modulus values P; and the different modulus values P of the modulation parameters A respectively corresponding to the different modulation manners are all ranged in (0, 1].

In this embodiment, the modulus value of the modulation parameter A is a power factor of a signal transmitted by a service node, is represented as P, and is used for performing a power control on modulation data. Modulation parameters A respectively corresponding to different modulation manners have different modulus values P, for example, P corresponding to a modulation manner with a higher modulation order may be the smaller, so as to reduce the modulation data power to a greater extent. In this embodiment, the value ranges of the P corresponding to the different modulation manners are all (0, 1), and the service node may flexibly configure the P within the value range. For data adopting different modulation manners, the corresponding P is also different, for example, for data with a high peak to average power ratio, the modulus value P of the modulation parameter A may be smaller, so that the power is reduced, signals at the transmitting terminal may be ensured to be in the linear region of the power amplifier, the problems of signal distortion, error vector magnitude (EVM) deterioration and the like are prevented, and the out-of-band leakage may also be reduced.

In some embodiments, P is a function related to the modulation manner, is known at the receiving terminal and the sending terminal, and provides a reliable basis for data modulation at the receiving terminal and data demodulation at the sending terminal.

In an embodiment, the modulation parameter A is a real number, that is, A=P; P is in negative correlation with a modulation order of the data; and P corresponding to data with a lowest modulation order is equal to 1.

In this embodiment, A is a real number, that is, A=P, and is used for performing a power control on the data. P corresponding to different modulation parameters is in a negative correlation relationship with the modulation order of the data, that is, P with a low-order modulation is the larger, and P with a high-order modulation is the smaller, so that the power may be reduced to a greater extent for data with a high-order modulation. P corresponding to data with a lowest modulation order is equal to 1, so that the power control is performed on a baseband modulation symbol. Different power distribution weights may be given to different modulation manners through different P values so as to compensate the power of the data with the high peak to average power ratio.

In an embodiment, the modulation parameter A is a real number, that is, A=P; P is in negative correlation with a peak to average power ratio of the modulation manner; and where P corresponding to data with a lowest peak to average power ratio is equal to 1.

In this embodiment, A is a real number, that is A=P, and is used for performing power control on data. P corresponding to different modulation parameters are in a negative correlation relationship with the peak to average power ratio of the modulation manner, that is, P corresponding to a modulation manner with a higher peak to average power ratio is smaller, so that the power may be reduced to a greater extent for the modulation data with higher peak to average power ratio. For data with a lowest peak to average power ratio, power does not need to be reduced, the modulated peak to average power ratio may be kept unchanged, that is, the corresponding P value may be 1. In some embodiments, and P corresponding to different modulation parameters may also be equal.

In an embodiment, the modulation manner includes at least one of: a phase-shift keying (PSK) modulation, a quadrature amplitude modulation (QAM), an amplitude phase shift keying (APSK) modulation, a π/2 binary phase shift keying (BPSK) modulation, or a π/4 BPSK modulation;

In an embodiment, the PSK modulation includes at least one of: a binary phase shift keying (BPSK) modulation, or a quadrature phase shift keying (QPSK), or 8PSK; the QAM includes at least one of: 16QAM, 64QAM, 256QAM or 1024QAM; and the APSK modulation includes at least one of: 16APSK, 32APSK or 64APSK.

In an embodiment, the step 120 includes that: in the single-carrier downlink transmission, a constellation point modulation is performed on time domain data in a downlink transmission according to the target constellation point symbol.

In this embodiment, for a case of the single-carrier downlink transmission, the constellation point modulation is performed on the time domain data according to A*X. The time domain data is mapped onto a constellation diagram after a modulation and a channel coding. For example, data may be decomposed into in-phase components and orthogonal components after a QAM modulation, a combination of an amplitude of any in-phase component and an amplitude of any orthogonal component maps one corresponding constellation point on a polar coordinate graph, each constellation point corresponds to a time domain data signal with certain amplitude and phase, and the signal is transmitted to the terminal by the service node after being modulated according to the target constellation point symbol.

Figure 2:
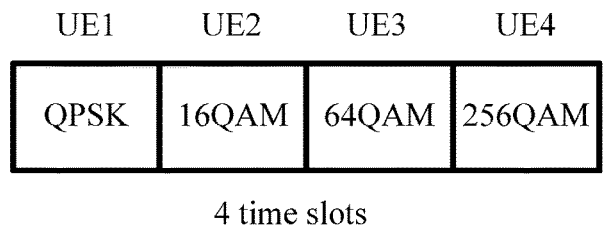
FIG. 2 is a schematic diagram of a data modulation for constellation points corresponding to different time slots provided in an embodiment.

FIG. 2 is a schematic diagram of a data modulation for constellation points corresponding to different time slots provided in an embodiment. As shown in FIG. 2, time domain data of a total of 4 time slots need a downlink transmission, the 4 time slots correspond to 4 different user equipments (UEs), because distances between each UE and a service node are different, an adopted modulation manner is QPSK, 16QAM, 64QAM and 256QAM, and P may be configured in units of time slots, for example, according to the relationship of peak to average power ratios of the 4 modulation manners, the corresponding P is set to be $$P = \left[1, \frac{1}{2}, \frac{1}{4}, \frac{1}{8}\right],$$

on this basis, time domain data on different time slots are multiplied by a corresponding P on a baseband to complete a data modulation containing a power distribution.

In an embodiment, P is in negative correlation with a PAPR value corresponding to a peak to average power ratio (PAPR) curve of the modulation manner at a set probability value; or P is in negative correlation with a cubic metric (CM) value of a CM curve of the modulation manner. The negative correlation is also referred to as a monotonic decrease, so as to achieve a greater power reduction for data with a higher PAPR value or a higher CM value. However, in some embodiments, there is not a strict monotonic decrease between P and the PAPR value or the CM value, and in some cases, the P value may remain unchanged as the PAPR value or the CM value increases or decreases.

In this embodiment, the P value may be set according to the PAPR value or the CM value to achieve the power backoff. According to actual situations and requirements, P may be configured according to performance curves with different peak to average power ratios, and therefore better transmission performance is obtained.

Figure 3:
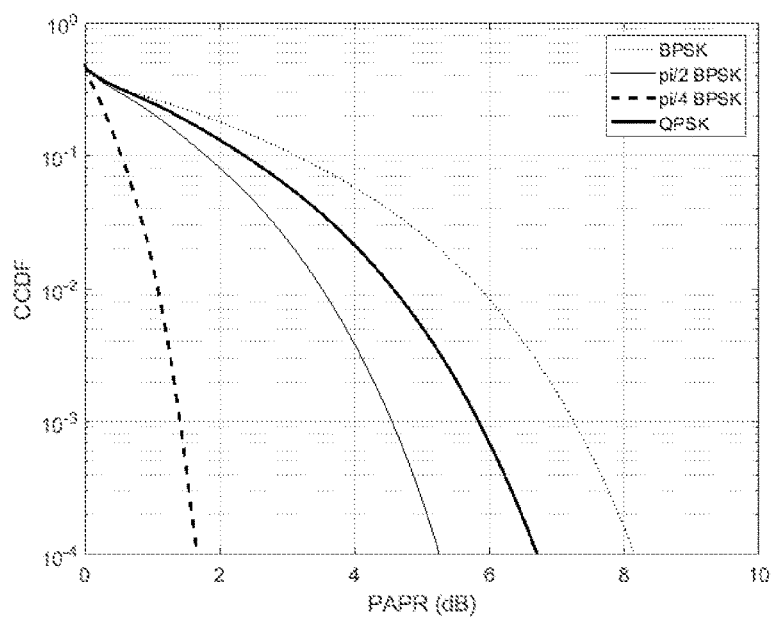
FIG. 3 is a schematic diagram of data being modulated according to a peak to average power ratio provided in an embodiment.

FIG. 3 is a schematic diagram of data being modulated according to a peak to average power ratio provided in an embodiment. As shown in FIG. 3, time domain data with 4 time slots needs to be performed a downlink transmission, the 4 time slots respectively correspond to 4 different UEs, because distances between each UE and a service node are different, a modulation manner is BPSK, π/2 BPSK, π/4 BPSK and QPSK, respectively, P is set by using the time slot as a unit, and a size relation of the peak to average power ratios of 4 modulation manners may be determined according to PAPR simulation results of the 4 modulation manners as follows: π/4 BPSK<π/2 BPSK<QPSK<BPSK. Values of the peak to average power ratios of the 4 modulation manners at the complementary cumulative distribution function (CCDF) of $10^{-4}$ are [8.2 dB, 5.2 dB, 1.6 dB and 6.7 dB], respectively, and these values are used as a basis for setting P, power factors configured for 4 time slots may be approximately obtained as follows:

$$P = \left[\frac{2}{9}, \frac{1}{2}, 1, \frac{1}{3}\right],$$

on this basis, time domain data on different time slots are multiplied by a corresponding P on a baseband to complete a data modulation containing a power distribution. CCDF is used for defining a probability that a peak to average value exceeds a threshold value z in a multi-carrier transmission system.

Figure 4:
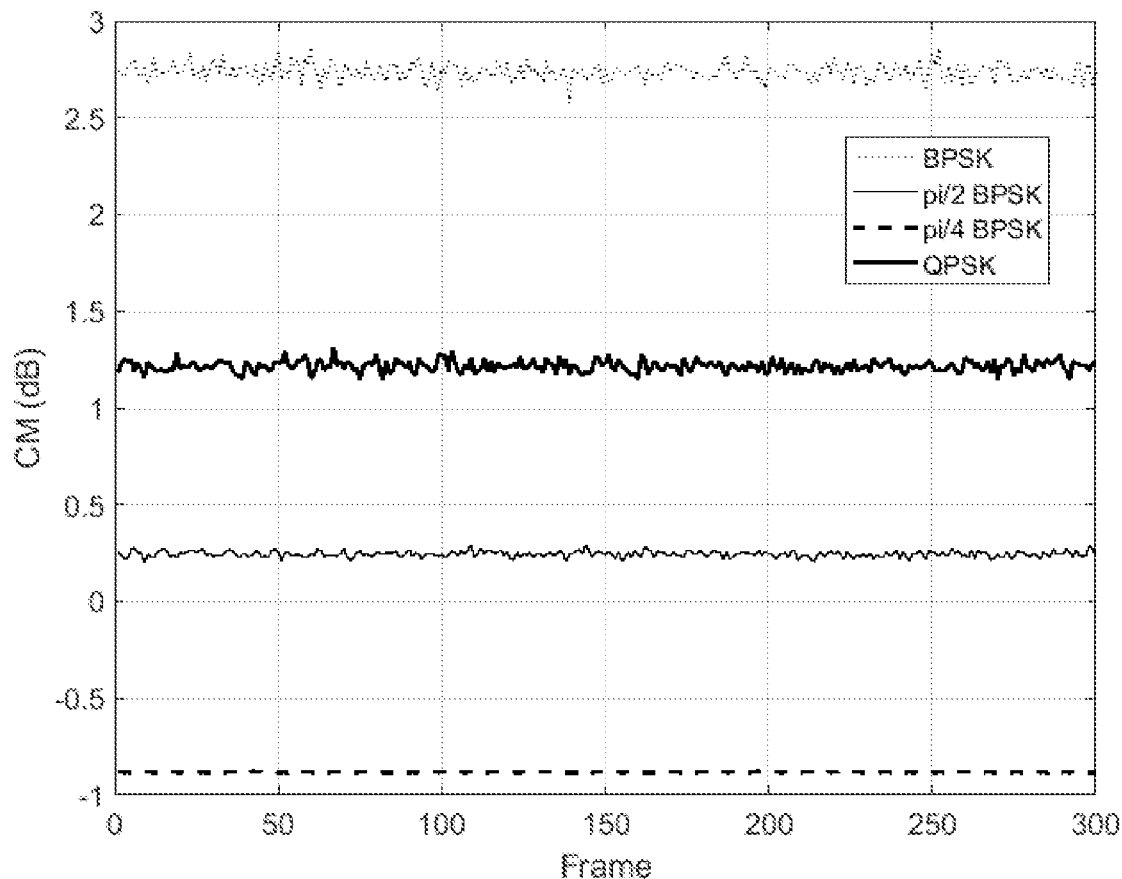
FIG. 4 is a schematic diagram of data being modulated according to a cubic metric provided in an embodiment.

FIG. 4 is a schematic diagram of data being modulated according to a cubic metric provided in an embodiment. In this embodiment, as shown in FIG. 4, data with 4 time slots needs to be performed a downlink transmission, the 4 time slots respectively correspond to 4 pieces of data of different UEs, distances between each UE and a service node are different, an adopted modulation manner is BPSK, π/2 BPSK, π/4 BPSK and QPSK, respectively, P is set by using the time slot as a unit, and a size relation of the peak to average power ratios of 4 modulations may be determined according to simulation results of CM curves of the 4 modulation manners as follows: π/4 BPSK<π/2 BPSK<QPSK<BPSK, four CM values are [2.7 dB, 0.3 dB, −0.9 dB, 1.2 dB], respectively, this value is used as a basis for setting the power factor, power factors configured for 4 time slots may be approximately obtained as follows:

$$P = \left[\frac{1}{8}, \frac{1}{2}, 1, \frac{1}{4}\right],$$

on this basis, time domain data on different time slots are multiplied by a corresponding P on a baseband to complete a data modulation containing a power distribution.

In an embodiment, the time domain data includes time domain data corresponding to multiple terminals, and the time domain data corresponding to the multiple terminals correspond to different modulation manners, different modulation orders and different PAPRs In an embodiment, modulation parameters corresponding to time domain data in a time slot or in a sub-frame are the same, the time domain data in the time slot or in the sub-frame is time domain data of a same terminal of the multiple terminals, modulation parameters corresponding to time domain data in different time slots or in different sub-frames are different, and the time domain data in the different time slots or in the different sub-frames respectively corresponds to different terminals of the multiple terminals; or modulation parameters corresponding to different symbols in a time slot are different, and time domain data of the different symbols respectively corresponds to different terminals of the multiple terminals.

In this embodiment, a case that a time slot corresponds to one modulation parameter is shown in FIG. 2, 4 time slots correspond to 4 different UEs, respectively, and the configuration of P (A=P) may be that time domain data on different time slots are multiplied by a corresponding P respectively on a baseband by using the time slot as a unit to complete a data modulation containing a power distribution.

Figure 5:
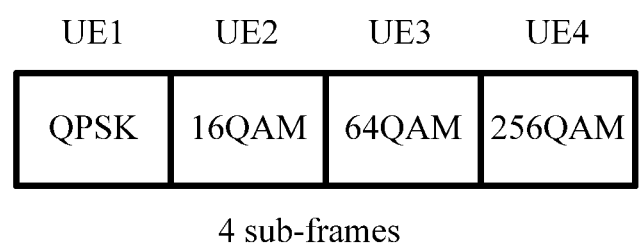
FIG. 5 is a schematic diagram of a data modulation for constellation points corresponding to different sub-frames provided in an embodiment.

FIG. 5 is a schematic diagram of a data modulation for constellation points corresponding to different sub-frames provided in an embodiment. As shown in FIG. 5, data with 4 sub-frames needs to be performed a downlink transmission, the 4 sub-frames respectively correspond to 4 pieces of data of different UEs, distances between each UE and a service node are different, an adopted modulation manner is QPSK, 16QAM, 64QAM, 256QAM, respectively, P (A=P) is set by using the sub-frame as a unit, and according to the relationship of peak to average power ratios of the 4 modulation manners, P corresponding to the 4 sub-frames may be set as follows:

$$P = \left[1, \frac{1}{2}, \frac{1}{4}, \frac{1}{8}\right],$$

on this basis, time domain data on different time slots are multiplied by a corresponding P on a baseband to complete a data modulation containing a power distribution.

Figure 6:
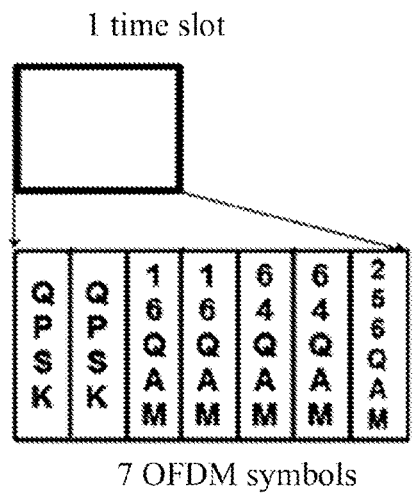
FIG. 6 is a schematic diagram of a data modulation for constellation points corresponding to different symbols provided in an embodiment.

FIG. 6 is a schematic diagram of a data modulation for constellation points corresponding to different symbols provided in an embodiment. As shown in FIG. 6, time domain data of a time slot needs to be performed a downlink transmission, 7 orthogonal frequency division multiplexing (OFDM) symbols respectively correspond to 7 pieces of data of different UEs, each UE occupies 1 OFDM symbol, distances between each UE and a service node are different, an adopted modulation manner is QPSK, 16QAM, 64QAM and 256QAM, respectively, P (A=P) is set by using the OFDM symbol as a unit, and according to the relationship of peak to average power ratios of the 4 modulation manners, P corresponding to 7 OFDM symbols may be set as follows:

$$P = \left[1, 1, \frac{1}{2}, \frac{1}{2}, \frac{1}{4}, \frac{1}{4}, \frac{1}{8}\right],$$

on this basis, time domain data on different time slots are multiplied by a corresponding P on a baseband to complete a data modulation containing a power distribution.

In an embodiment, modulation parameters corresponding to the time domain data of the multiple terminals are the same; or modulation parameters corresponding to the time domain data of the multiple terminals are configured with default values. For example, the default value is 1. On this basis, the configuration of the modulation parameters may be simplified, and thus the convenience and the modulation efficiency of a data modulation may be improved.

In an embodiment, the target constellation point symbol and the modulation parameter A are preconfigured by the service node or predefined in a protocol. On the basis, the configuration of the modulation parameter may be simplified, so that the service node and the terminal side may perform a data modulation or demodulation according to the target constellation point symbol and the known modulation parameter, and thus the convenience and the modulation efficiency of a data modulation are improved.

In an embodiment, the method further includes a step 130 of sending control information. The control information is sent through radio resource control (RRC) signaling or is sent in a control channel, and the control channel includes a physical downlink control channel (PDCCH) or a physical broadcast channel (PBCH).

In an embodiment, the control information includes a configuration indication domain, and the configuration indication domain is configured for indicating whether the modulation parameter A needs to be configured; in a case where the configuration indication domain is a first set value, the modulation parameter A needs to be configured by the service node; and in a case where the configuration indication domain is a second set value, the modulation parameter A does not need to be configured by the service node, or the modulation parameters A respectively corresponding to data of different terminals are all configured as 1.

In this embodiment, one bit of the control information is utilized to indicate whether the service node needs to configure A for the time domain data. If a bit value is 1, it is indicated that A needs to be configured, a value of A is determined at the sending terminal according to the modulation manner, a modulation is performed according to A*X, and A is determined at the receiving terminal according to the modulation manner and a modulus value correction and a data demodulation are performed according to the A; if the bit value is 0, it is indicated that A does not need to be configured, or the value of A is 1, and therefore whether the modulation parameter need to be configured may be indicated through a small amount of control information, and the flexibility and practicability of a data modulation are improved.

Figure 7:
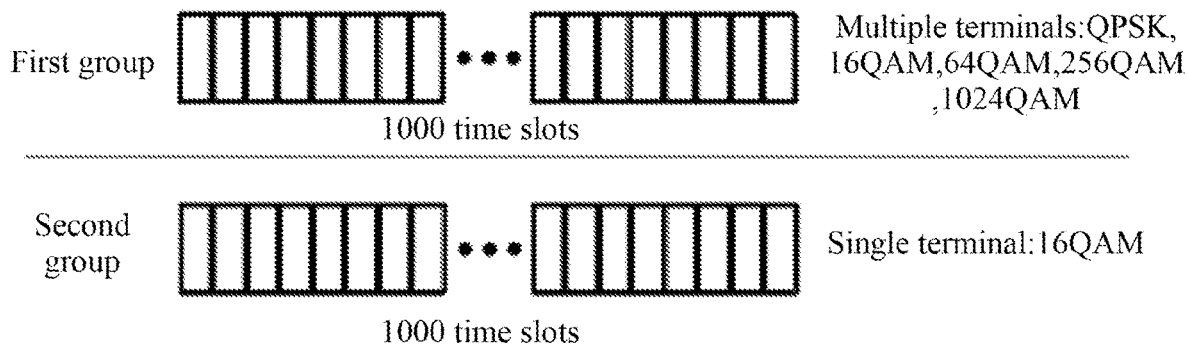
FIG. 7 is a schematic diagram of a data modulation for a terminal group provided in an embodiment.

FIG. 7 is a schematic diagram of a data modulation for a terminal group provided in an embodiment. As shown in FIG. 7, if two groups of data need to be subjected to a single-carrier downlink transmission, each group of data consists of 1000 time slots. A first group of data is composed of data of multiple UEs, and corresponding modulation manners are various; a second group of data is data of a single UE, with only one modulation manner (such as, 16QAM). In this case, a bit value of the control information in the PDCCH may be [1, 0], i.e., A is needed to be configured for the first group of data, and A is not needed for the second group of data. For example, for the first group of data, P (A=P) may be configured as:

$$P(QPSK, 16QAM, 64QAM, 256QAM, 1024QAM) = \left[1, \frac{1}{2}, \frac{1}{4}, \frac{1}{8}, \frac{1}{16}\right],$$

respectively, P values are known at both the sending terminal and the receiving terminal, a power distribution modulation may be performed directly at the sending terminal, and the modulo value of the data after a channel equalization is corrected at the receiving terminal.

FIG. 8 is a schematic diagram of a data modulation for a terminal group provided in another embodiment. As shown in FIG. 8, data with 4 time slots needs to be performed a downlink transmission, the 4 time slots respectively adopt QPSK, QPSK, 16QAM and 16QAM modulation manners, and if the power factor configuration is in units of time slots, then P (A=P) may be configured as:

$$P = \left[1, 1, \frac{1}{2}, \frac{1}{2}\right]$$

for constellation points in 4 time slots according to a relationship of the peak to average power ratios of 2 modulation manners. As shown in FIG. 8, and power factors are multiplied by constellation points X1 and X2 modulated by QPSK and 16QAM which are originally subjected to power normalization to obtain modulation constellation points $P_1*X1$ and $P_2*X2$ after a power distribution.

An embodiment of the present application further provides a data demodulation method, applied to a terminal, a modulation parameter may be determined according to a modulation manner of data, time domain data is demodulated by using a target constellation point symbol and the modulation parameter, so that the flexible demodulation of the time domain data may be achieved, and the power control or rollback may also be achieved, and thus the demodulation efficiency and reliability are improved.

FIG. 9 is a flowchart of a data demodulation method provided in an embodiment, as shown in FIG. 9, and the method provided in this embodiment includes steps 210 and 220. The operations performed by the terminal in this embodiment correspond to the operations performed by the service node in the above-described embodiments, and technical details not described in detail in this embodiment may be referred to any of the above-described embodiments.

In step 210, data modulated according to a target constellation point symbol is received, where the target constellation point symbol is a product of A and X, X is an initial constellation point symbol corresponding to a modulation manner, and A is a modulation parameter determined according to the modulation manner of the data.

In step 220, the data is demodulated according to the target constellation point symbol and the modulation parameter A.

In this embodiment, the data modulation manner may be an amplitude modulation, a frequency modulation, a phase modulation, and the like, and the communication quality of a long-distance transmission is improved by loading the data signal spectrum into a high-frequency channel for transmission. The modulation parameter A may be a complex number or a real number, and if A is the real number, the modulation parameter A may be used for performing a power control on a data transmission, so that a quick power backoff is achieved; if A is the complex number, the modulation parameter A may be used for changing the modulation manner of data.

In a single-carrier downlink transmission, a target constellation point symbol adopted by a data modulation on a time domain may be represented as A*X, and X represents the initial constellation point symbol corresponding to the modulation manner. For each constellation point, the data is multiplied by the modulation parameter on the basis of the data modulated by the modulation manner described above, in this case, a power back-off does not need to be performed on data of different symbols, signals of a transmitting terminal may be flexibly and quickly ensured to be in a linear region of a power amplifier, and thus the modulation efficiency and reliability are improved.

In an embodiment, the modulation parameter A has a modulus value P, and modulation parameters A respectively corresponding to different modulation manners have different modulus values P; and value ranges of the P corresponding to the different modulation manners are all (0, 1].

In an embodiment, the method further includes a step 201 of receiving control information.

The control information is received through RRC signaling or in a control channel, and the control channel includes PDCCH or PBCH.

The control information includes a configuration indication domain, and the configuration indication domain is configured for indicating whether the modulation parameter A needs to be configured. In a case where the configuration indication domain is a first set value, the modulation parameter A needs to be configured by the terminal; and in a case where the configuration indication domain is a second set value, the modulation parameter A does not need to be configured by the terminal, or the modulation parameters respectively corresponding to data of terminals are all configured as 1.

In this embodiment, whether the modulation parameter A needs to be configured for the data is determined according to the control information. For example, if a bit value in the control information is 1, then it represents that the service node determines a value of A at the sending terminal according to the modulation manner and performs a modulation according to A*X, and the terminal may determine A according to the modulation manner and perform a mode value correction and a data demodulation according to the value; if the bit value is 0, it represents that A does not need to be configured, or values of A are all configured as 1, and therefore whether the modulation parameter need to be configured may be indicated through a small amount of control information, and the flexibility and practicability of a data modulation are improved.

In an embodiment, the step 220 includes steps 221 and 222. In step 221, for data modulated according to the target constellation point symbol, the modulation parameter A is determined according to the modulation manner of the data, and the modulation parameter A has a modulus value P. In step 222, a modulus value of the data after a channel equalization is corrected according to the P.

In this embodiment, in a single-carrier downlink transmission, a target constellation point symbol adopted by a data modulation on a time domain may be represented as A*X, and X represents the initial constellation point symbol corresponding to the modulation manner. In a process of a data demodulation for each constellation point, the modulus value of the data after channel equalization is corrected according to the modulation parameter A (for example, according to a modulus value P of A), a power back-off does not need to be performed on data of different symbols, signals of a transmitting terminal may be flexibly and quickly ensured to be in a linear region of a power amplifier, and thus the modulation efficiency and reliability are improved.

In an embodiment, the modulation parameter A is a real number, that is, A=P; P is in negative correlation with a modulation order of the data; P corresponding to data with a lowest modulation order is equal to 1.

In an embodiment, the modulation parameter A is a real number, that is, A=P; P is in negative correlation with a peak to average power ratio of the modulation manner; and where P corresponding to data with a lowest peak to average power ratio is equal to 1.

In an embodiment, the modulation manner includes at least one of: a PSK modulation, a QAM, an APSK modulation, a π/2 BPSK modulation, or a π/4 BPSK modulation; the PSK modulation includes at least one of: a binary phase shift keying (BPSK) modulation, or QPSK, or 8PSK; the QAM includes at least one of: 16QAM, 64QAM, 256QAM or 1024QAM; and the APSK modulation includes at least one of: 16APSK, 32APSK or 64APSK.

In an embodiment, in a single-carrier downlink transmission, the service node performs a constellation point modulation on time domain data in a downlink transmission according to the target constellation point symbol.

In an embodiment, P is in negative correlation with a PAPR value corresponding to a peak to average power ratio (PAPR) curve of the modulation manner at a set probability value; or P is in negative correlation with a cubic metric (CM) value of a CM curve of the modulation manner.

In an embodiment, the time domain data includes time domain data corresponding to multiple terminals, and the time domain data corresponding to the multiple terminals correspond to different modulation manners, different modulation orders and different PAPRs.

In an embodiment, modulation parameters corresponding to time domain data in a time slot or in a sub-frame are the same, the time domain data in the time slot or in the sub-frame is time domain data of a same terminal of the multiple terminals, modulation parameters corresponding to time domain data in different time slots or in different sub-frames are different, and the time domain data in the different time slots or in the different sub-frames respectively corresponds to different terminals of the multiple terminals; or modulation parameters corresponding to different symbols in a time slot are different, and time domain data of the different symbols respectively corresponds to different terminals of the multiple terminals.

In an embodiment, modulation parameters respectively corresponding to the time domain data of the multiple terminals are the same; or modulation parameters respectively corresponding to the time domain data of the multiple terminals are configured with default values.

In an embodiment, the target constellation point symbol and the modulation parameter A are preconfigured by the service node or predefined in a protocol.

An embodiment of the present application further provides a data modulation device. FIG. 10 is a schematic structural diagram of a data modulation device provided in an embodiment. As shown in FIG. 10, the data modulation device includes a parameter determination module 310 and a modulation module 320.

The parameter determination module 310 is configured to determine a modulation parameter A according to a modulation manner of data. The modulation module 320 is configured to modulate the data according to a target constellation point symbol, where the target constellation point symbol is a product of A and X, and X is an initial constellation point symbol corresponding to the modulation manner.

According to the data modulation device in this embodiment, the modulation parameter is determined according to the modulation manner of the data, the data is modulated according to the target constellation point symbol by using the modulation parameter, so that a flexible modulation of time domain data may be achieved, the power control or back-off can also be achieved, and therefore the modulation efficiency and reliability are improved.

In an embodiment, the modulation parameter A has a modulus value P, and modulation parameters A respectively corresponding to different modulation manners have different modulus values P; and the different modulus values P of the modulation parameters A respectively corresponding to the different modulation manners are all ranged in (0, 1].

In an embodiment, the modulation parameter A is a real number, that is, A=P; P is in negative correlation with a modulation order of the data; and P corresponding to data with a lowest modulation order is equal to 1.

In an embodiment, the modulation parameter A is a real number, that is, A=P; P is in negative correlation with a peak to average power ratio (PAPR) of the modulation manner; and P corresponding to data with a lowest PAPR is equal to 1.

In an embodiment, the modulation manner includes at least one of: a phase-shift keying (PSK) modulation, a quadrature amplitude modulation (QAM), an amplitude phase shift keying (APSK) modulation, a π/2 binary phase shift keying (BPSK) modulation, or a π/4 BPSK modulation. The PSK modulation includes at least one of: a BPSK modulation, or a quadrature phase shift keying (QPSK), or 8PSK. The QAM includes at least one of: 16QAM, 64QAM, 256QAM or 1024QAM. The APSK modulation includes at least one of: 16APSK, 32APSK or 64APSK.

In an embodiment, the modulation module 320 is configured to, in a single-carrier downlink transmission, perform a constellation point modulation on time domain data in a downlink transmission according to the target constellation point symbol.

In an embodiment, P is in negative correlation with a PAPR value corresponding to a peak to average power ratio (PAPR) curve of the modulation manner at a set probability value; or P is in negative correlation with a cubic metric (CM) value of a CM curve of the modulation manner.

In an embodiment, the time domain data includes time domain data corresponding to multiple terminals, and the time domain data corresponding to the multiple terminals correspond to different modulation manners, different modulation orders and different PAPRs.

In an embodiment, modulation parameters corresponding to time domain data in a time slot or in a sub-frame are the same, the time domain data in the time slot or in the sub-frame is time domain data of a same terminal of the multiple terminals, modulation parameters corresponding to time domain data in different time slots or in different sub-frames are different, and the time domain data in the different time slots or in the different sub-frames respectively corresponds to different terminals of the multiple terminals; or modulation parameters corresponding to different symbols in a time slot are different, and time domain data of the different symbols respectively corresponds to different terminals of the multiple terminals.

In an embodiment, modulation parameters respectively corresponding to the time domain data of the multiple terminals are the same; or modulation parameters respectively corresponding to the time domain data of the multiple terminals are configured with default values.

In an embodiment, the target constellation point symbol and the modulation parameter A are preconfigured by the service node or predefined in a protocol.

In an embodiment, the data modulation device further includes a control information sending module. The control information sending module is configured to send control information. The control information is sent through radio resource control (RRC) signaling or is sent in a control channel, and the control channel includes a physical downlink control channel (PDCCH) or a physical broadcast channel (PBCH). The control information includes a configuration indication domain, and the configuration indication domain is configured for indicating whether the modulation parameter A needs to be configured. In a case where the configuration indication domain is a first set value, the configuration indication domain indicates that the modulation parameter A needs to be configured by the service node. In a case where the configuration indication domain is a second set value, the configuration indication domain indicates that the modulation parameter A does not need to be configured by the service node, or the modulation parameters A respectively corresponding to data of different terminals are all configured as 1.

The data modulation device provided in this embodiment belongs to the same application concept as the data modulation method proposed in the above-described embodiments, technical details not described in detail in this embodiment may be referred to any of the above-described embodiments, and this embodiment has the same effect as performing the data modulation method.

Figure 11:
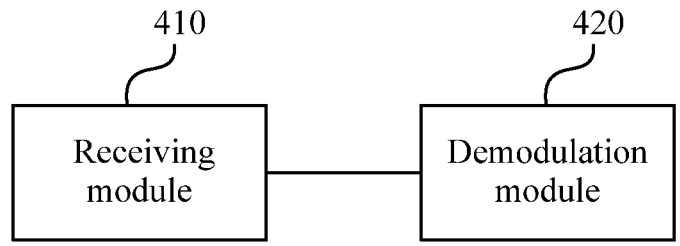
FIG. 11 is a schematic structural diagram of a data demodulation device provided in an embodiment.

An embodiment of the present application further provides a data demodulation device. FIG. 11 is a schematic structural diagram of a data demodulation device provided in an embodiment. As shown in FIG. 11, the data demodulation device includes a receiving module 410 and a demodulation module 420.

The receiving module 410 is configured to receive data modulated according to a target constellation point symbol, where the target constellation point symbol is a product of A and X, X is an initial constellation point symbol corresponding to a modulation manner of the data, and A is a modulation parameter determined according to the modulation manner of the data. The demodulation module 420 is configured to demodulate the data according to the target constellation point symbol and the modulation parameter A.

According to the data demodulation device in this embodiment, the modulation parameter may be determined according to the modulation manner of the data, so that a flexible modulation of time domain data may be achieved, the power control or back-off may also be achieved, and therefore the demodulation efficiency and reliability are improved according to the target constellation point symbol and the modulation parameter A.

In an embodiment, the modulation parameter A has a modulus value P, and modulation parameters A respectively corresponding to different modulation manners have different modulus values P; and the different modulus values P of the modulation parameters A respectively corresponding to the different modulation manners are all ranged in (0, 1].

In an embodiment, the data demodulation device further includes a control information receiving module. The control information receiving module is configured to receive control information. The control information is received through radio resource control (RRC) signaling or is received in a control channel, and the control channel includes a physical downlink control channel (PDCCH) or a physical broadcast channel (PBCH). The control information includes a configuration indication domain, and the configuration indication domain is configured for indicating whether the modulation parameter A needs to be configured. In a case where the configuration indication domain is a first set value, the modulation parameter A needs to be configured by the terminal. In a case where the configuration indication domain is a second set value, the modulation parameter A does not need to be configured by the terminal, or modulation parameters respectively corresponding to data of different terminals are all configured as 1.

In an embodiment, the demodulation module 420 is configured to: determine the modulation parameter A according to the modulation manner of the data for data modulated according to the target constellation point symbol, and the modulation parameter A has a modulus value P; and correct a modulus value of the data after a channel equalization according to the P.

In an embodiment, the modulation parameter A is a real number, that is, A=P; P is in negative correlation with a modulation order of the data; and P corresponding to data with a lowest modulation order is equal to 1.

In an embodiment, the modulation parameter A is a real number, that is, A=P; P is in negative correlation with a peak to average power ratio (PAPR) of the modulation manner; and P corresponding to data with a lowest PAPR is equal to 1.

In an embodiment, the modulation manner includes at least one of: a phase-shift keying (PSK) modulation, a quadrature amplitude modulation (QAM), an amplitude phase shift keying (APSK) modulation, a $\pi/2$ binary phase shift keying (BPSK) modulation, or a $\pi/4$ BPSK modulation. The PSK modulation includes at least one of: a BPSK modulation, or a quadrature phase shift keying (QPSK), or 8PSK. The QAM includes at least one of: 16QAM, 64QAM, 256QAM or 1024QAM. The APSK modulation includes at least one of: 16APSK, 32APSK or 64APSK.

In an embodiment, in a single-carrier downlink transmission, the service node performs a constellation point modulation on time domain data in a downlink transmission according to the target constellation point symbol.

In an embodiment, P is in negative correlation with a PAPR value corresponding to a peak to average power ratio (PAPR) curve of the modulation manner at a set probability value; or P is in negative correlation with a cubic metric (CM) value of a CM curve of the modulation manner.

In an embodiment, the time domain data includes time domain data corresponding to multiple terminals, and the time domain data corresponding to the multiple terminals correspond to different modulation manners, different modulation orders and different PAPRs.

In an embodiment, modulation parameters corresponding to time domain data in a time slot or in a sub-frame are the same, the time domain data in the time slot or in the sub-frame is time domain data of a same terminal of the multiple terminals, modulation parameters corresponding to time domain data in different time slots or in different sub-frames are different, and the time domain data in the different time slots or in the different sub-frames respectively corresponds to different terminals of the multiple terminals; or modulation parameters corresponding to different symbols in a time slot are different, and time domain data of the different symbols respectively corresponds to different terminals of the multiple terminals.

In an embodiment, modulation parameters respectively corresponding to the time domain data of the multiple terminals are the same; or modulation parameters respectively corresponding to the time domain data of the multiple terminals are configured with default values.

In an embodiment, the target constellation point symbol and the modulation parameter A are preconfigured by the service node or predefined in a protocol.

The data demodulation device provided in this embodiment belongs to the same application concept as the data modulation method proposed in the above-described embodiments, technical details not described in detail in this embodiment may be referred to any of the above-described embodiments, and this embodiment has the same effect as performing the data modulation method.

An embodiment of the present application further provides a service node. The data modulation method may be performed by the data modulation device, the data modulation device may be implemented in software and/or hardware, and may be integrated in the service node. The service node is, for example, a base station.

Figure 12:
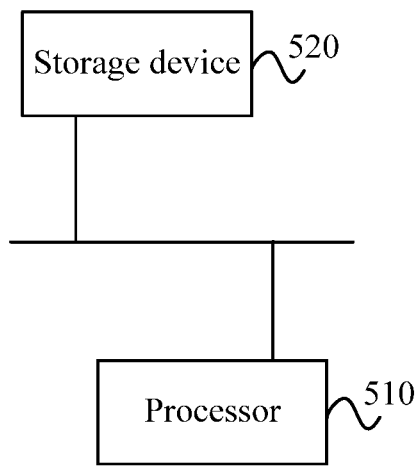
FIG. 12 is a schematic diagram of a hardware structure of a service node provided in an embodiment.

FIG. 12 is a schematic diagram of a hardware structure of a service node provided in an embodiment. As shown in FIG. 12, a service node provided in this embodiment includes a processor 510 and a storage device 520. The processor in the service node may be one or more, with one processor 510 as an example in FIG. 12, and the processor 510 and the storage device 520 in the apparatus may be connected via a bus or in other manners, and the processor 510 and the storage device 520 in the apparatus being connected via the bus is used as an example in FIG. 12.

One or more programs are executed by the one or more processors 510 to enable the one or more processors to implement the data modulation method of any of the embodiments described above.

The storage device 520 in the service node serves as a computer-readable storage medium and may be used for storing the one or more programs, and the program may be a software program, a computer executable program and a module, such as a program instruction/module (such as, the module in the data modulation device shown in FIG. 10, including the parameter determination module 410 and the modulation module 420) corresponding to the data modulation method in the embodiments of the present application. The processor 510 executes various functional applications and data processing of the service node, i.e., implements the data modulation method in the above-described method embodiments, by executing software programs, instructions, and modules stored in the storage device 520.

The storage device 520 mainly includes a storage program region and a storage data region, where the storage program region may store an operating system, an application program required for at least one function; the storage data region may store data or the like (such as, the modulation parameter, the time domain data in the above-described embodiments) created according to the use of the apparatus. Moreover, the storage device 520 may include a high-speed random access memory and may also include a non-volatile memory, such as at least one magnetic disk storage device, flash memory device, or other non-volatile solid-state memory devices. In some instances, the storage device 520 may include a memory remotely disposed with respect to the processor 510, the remote memory may be connected to the management device over a network. Instances of such networks include, but are not limited to, an Internet, an intranet, a local area network, a mobile communication network, and combinations thereof.

Moreover, when the one or more programs included in the service node described above are executed by the one or more processors 510, the following operations are implemented: a modulation parameter A is determined according to a modulation manner of data; and the data is modulated according to a target constellation point symbol, where the target constellation point symbol is a product of A and X, and X is an initial constellation point symbol corresponding to the modulation manner.

The service node provided in this embodiment belongs to the same application concept as the data modulation method proposed in the above-described embodiments, technical details not described in detail in this embodiment may be referred to any of the above-described embodiments, and this embodiment has the same effect as performing the data modulation method.

An embodiment of the present application further provides a terminal. The data modulation method may be performed by the data demodulation device, the data demodulation device may be implemented in software and/or hardware, and may be integrated in the terminal. The terminal is, for example, a user apparatus.

Figure 13:
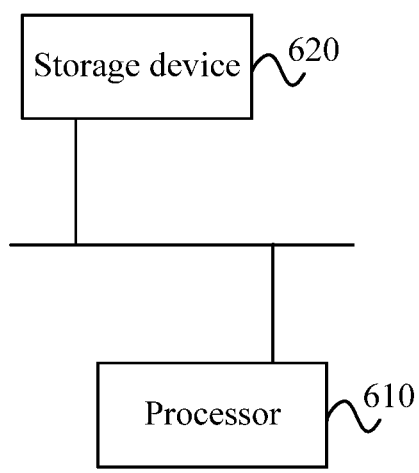
FIG. 13 is a schematic diagram of a hardware structure of a terminal provided in an embodiment.

FIG. 13 is a schematic diagram of a hardware structure of a terminal provided in an embodiment. As shown in FIG. 13, this embodiment provides a terminal including a processor 610 and a storage device 620. The processor in the terminal may be one or more, with one processor 610 as an example in FIG. 13, and the processor 610 and the storage device 620 in the apparatus may be connected via a bus or in other manners, and the processor 610 and the storage device 620 in the apparatus being connected via the bus is used as an example in FIG. 13.

One or more programs are executed by the one or more processors 610 to enable the one or more processors to implement the data demodulation method of any of the embodiments described above.

The storage device 620 in the terminal serves as a computer readable storage medium and may be used for storing the one or more programs, and the program may be a software program, a computer executable program and a module, such as a program instruction/module (such as, a module in the data demodulation device shown in FIG. 11, includes the receiving module 410 and the demodulation module 420) corresponding to the data demodulation method in the embodiments of the present application. The processor 610 executes various functional applications and data processing of the terminal, i.e., implements the data demodulation method in the above-described method embodiments, by executing software programs, instructions, and modules stored in the storage device 620.

The storage device 620 mainly includes a storage program region and a storage data region, where the storage program region may store an operating system, an application program required for at least one function; the storage data region may store data or the like (such as, the modulation parameter, the time domain data in the above-described embodiments) created according to the use of the apparatus. Moreover, the storage device 520 may include a high-speed random access memory and may also include a non-volatile memory, such as at least one magnetic disk storage device, flash memory device, or other non-volatile solid-state memory devices. In some instances, the storage device 520 may include a memory remotely disposed with respect to the processor 510, the remote memory may be connected to the management device over a network. Instances of such networks include, but are not limited to, an Internet, an intranet, a local area network, a mobile communication network, and combinations thereof.

Moreover, when the one or more programs included in the terminal described above are executed by the one or more processors 610, the following operations are implemented: data modulated according to a target constellation point symbol is received, where the target constellation point symbol is a product of A and X, X is an initial constellation point symbol corresponding to a modulation manner of the data, and A is a modulation parameter determined according to the modulation manner of the data; and the data is demodulated according to the target constellation point symbol and the modulation parameter A.

The terminal provided in this embodiment belongs to the same application concept as the data modulation method proposed in the above-described embodiments, technical details not described in detail in this embodiment may be referred to any of the above-described embodiments, and this embodiment has the same effect as performing the data modulation method.

An embodiment of the present application further provides a storage medium including a computer-executable instruction, where the computer-executable instruction is configured to perform, when by a computer processor, the data modulation method or the data demodulation method.

The data modulation method includes that: a modulation parameter A is determined according to a modulation manner of data; and the data is modulated according to a target constellation point symbol, where the target constellation point symbol is a product of A and X, and X is an initial constellation point symbol corresponding to the modulation manner.

The data demodulation method includes that: data modulated according to a target constellation point symbol is received, where the target constellation point symbol is a product of A and X, X is an initial constellation point symbol corresponding to a modulation manner of the data, and A is a modulation parameter determined according to the modulation manner of the data; and the data is demodulated according to the target constellation point symbol and the modulation parameter A.

In the above description of the implementation manners, the present application may be implemented by means of software and general purpose hardware, and may also be implemented by hardware. The technical scheme of the present application may be embodied in the form of a software product, and the computer software product may be stored in a computer readable storage medium, such as a floppy disk of a computer, a read-only memory (ROM), a random access memory (RAM), a flash memory (FLASH), a hard disk or an optional disk, including multiple instructions to enable a computer device (which may be a personal computer, a server, or a network device, etc.) to perform the method of any of the embodiments of the present application.

Any block diagram of the logic flow in the accompanying drawings of the present application may represent program steps, or may represent interconnected logic circuits, modules, and functions, or may represent a combination of program steps and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory device and system (digital versatile disc (DVD) or compact disk (CD)), etc. The computer readable medium may include a non-transitory storage medium. The data processor may be of any type suitable for the local technical environment, such as, but not limited to, a general-purpose computer, a specialized computer, a microprocessor, a digital signal processor (DSP), an application specific integrated circuit (ASIC), a field programmable gate array (FPGA), and a processor based on a multi-core processor architecture.

What is claimed is:

1. A data modulation method, applied to a service node, comprising:
   determining a modulation parameter A according to a modulation manner of data; and
   modulating the data according to a target constellation point symbol, wherein the target constellation point symbol is a product of A and X, and X is an initial constellation point symbol corresponding to the modulation manner;
   wherein the modulation parameter A has a modulus value P, and modulation parameters A respectively corresponding to different modulation manners have different modulus values P; and
   the different modulus values P of the modulation parameters A respectively corresponding to the different modulation manners are all ranged in (0,1].

2. The method of claim 1, wherein the modulation parameter A is a real number, that is, A=P; P is in negative correlation with a modulation order of the data; and
   wherein P corresponding to data with a lowest modulation order is equal to 1.

3. The method of claim 1, wherein the modulation parameter A is a real number, that is, A=P; P is in negative correlation with a peak to average power ratio (PAPR) of the modulation manner; and
   wherein P corresponding to data with a lowest PAPR is equal to 1.

4. The method of claim 1, wherein the modulation manner comprises at least one of: a phase-shift keying (PSK) modulation, a quadrature amplitude modulation (QAM), an amplitude phase shift keying (APSK) modulation, a $\pi/2$ binary phase shift keying (BPSK) modulation, or a $\pi/4$ BPSK modulation;
   wherein the PSK modulation comprises at least one of: a BPSK modulation, or a quadrature phase shift keying (QPSK), or 8PSK;
   wherein the QAM comprises at least one of: 16QAM, 64QAM, 256QAM or 1024QAM; and
   wherein the APSK modulation comprises at least one of: 16APSK, 32APSK or 64APSK.

5. The method of claim 1, wherein modulating the data according to the target constellation point symbol comprises:
   in a single-carrier downlink transmission, performing a constellation point modulation on time domain data in a downlink transmission according to the target constellation point symbol.

6. The method of claim 1, wherein,
   P is in negative correlation with a PAPR value corresponding to a PAPR curve of the modulation manner at a set probability value; or
   P is in negative correlation with a cubic metric (CM) value of a CM curve of the modulation manner.

7. The method of claim 1, wherein the data comprises time domain data corresponding to a plurality of terminals, and the time domain data corresponding to the plurality of terminals correspond to different modulation manners, different modulation orders and different PAPRs.

8. The method of claim 7, wherein,
modulation parameters corresponding to time domain data in a time slot or in a sub-frame are the same, the time domain data in the time slot or in the sub-frame is time domain data of a same terminal of the plurality of terminals, modulation parameters corresponding to time domain data in different time slots or in different sub-frames are different, and the time domain data in the different time slots or in the different sub-frames respectively corresponds to different terminals of the plurality of terminals; or
modulation parameters corresponding to different symbols in a time slot are different, and time domain data of the different symbols respectively corresponds to different terminals of the plurality of terminals.

9. The method of claim 7, wherein modulation parameters respectively corresponding to the time domain data of the plurality of terminals are the same; or modulation parameters respectively corresponding to the time domain data of the plurality of terminals are configured with default values.

10. The method of claim 1, wherein the target constellation point symbol and the modulation parameter A are preconfigured by the service node or predefined in a protocol.

11. The method of claim 1, further comprising:
sending control information;
wherein the control information is sent through radio resource control (RRC) signaling or is sent in a control channel, and the control channel comprises a physical downlink control channel (PDCCH) or a physical broadcast channel (PBCH);
the control information comprises a configuration indication domain, and the configuration indication domain is configured for indicating whether the modulation parameter A needs to be configured;
in a case where the configuration indication domain is a first set value, the configuration indication domain indicates that the modulation parameter A needs to be configured by the service node; and
in a case where the configuration indication domain is a second set value, the configuration indication domain indicates that the modulation parameter A does not need to be configured by the service node, or modulation parameters A respectively corresponding to data of different terminals are all configured as 1.

12. A data demodulation method, applied to a terminal, comprising:
receiving data modulated according to a target constellation point symbol, wherein the target constellation point symbol is a product of A and X, X is an initial constellation point symbol corresponding to a modulation manner of the data, and A is a modulation parameter determined according to the modulation manner of the data; and
demodulating the data according to the target constellation point symbol and the modulation parameter A,
wherein the modulation parameter A has a modulus value P, and modulation parameters A respectively corresponding to different modulation manners have different modulus values P; and
the different modulus values P of the modulation parameters A respectively corresponding to the different modulation manners are all ranged in (0, 1].

13. The method of claim 12, further comprising:
receiving control information;
wherein the control information is received through radio resource control (RRC) signaling or is received in a control channel, and the control channel comprises a physical downlink control channel (PDCCH) or a physical broadcast channel (PBCH);
wherein the control information comprises a configuration indication domain, and the configuration indication domain is configured for indicating whether the modulation parameter A needs to be configured;
in a case where the configuration indication domain is a first set value, the configuration indication domain indicates that the modulation parameter A needs to be configured by the terminal; and
in a case where the configuration indication domain is a second set value, the configuration indication domain indicates that the modulation parameter A does not need to be configured by the terminal, or modulation parameters respectively corresponding to data of different terminals are all configured as 1.

14. The method of claim 12, wherein demodulating the data according to the target constellation point symbol and the modulation parameter A comprises:
for data modulated according to the target constellation point symbol, determining the modulation parameter A according to the modulation manner of the data, wherein the modulation parameter A has a modulus value P; and
correcting a modulus value of the data after a channel equalization according to the P.

15. A service node, comprising:
at least one processor;
a storage device, which is configured to store at least one program;
wherein the at least one program, when executed by the at least one processor, causes the at least one processor to implement:
determining a modulation parameter A according to a modulation manner of data; and
modulating the data according to a target constellation point symbol, wherein the target constellation point symbol is a product of A and X, and X is an initial constellation point symbol corresponding to the modulation manner,
wherein the modulation parameter A has a modulus value P, and modulation parameters A respectively corresponding to different modulation manners have different modulus values P; and
the different modulus values P of the modulation parameters A respectively corresponding to the different modulation manners are all ranged in (0,1].

16. A terminal, comprising:
at least one processor;
a storage device, which is configured to store at least one program;
wherein the at least one program, when executed by the at least one processor, causes the at least one processor to implement the data demodulation method of claim 12.

17. A non-transitory computer-readable storage medium, storing a computer program, wherein the computer program, when executed by a processor, implements the data modulation method of claim 1.

18. A non-transitory computer-readable storage medium, storing a computer program, wherein the computer program, when executed by a processor, implements the data demodulation method of claim 12.

* * * * *